March 6, 1962
A. R. VAN CORTLANDT WARRINGTON
3,024,389
THREE-PHASE PROTECTIVE RELAY SYSTEMS
Filed May 29, 1958
2 Sheets-Sheet 1
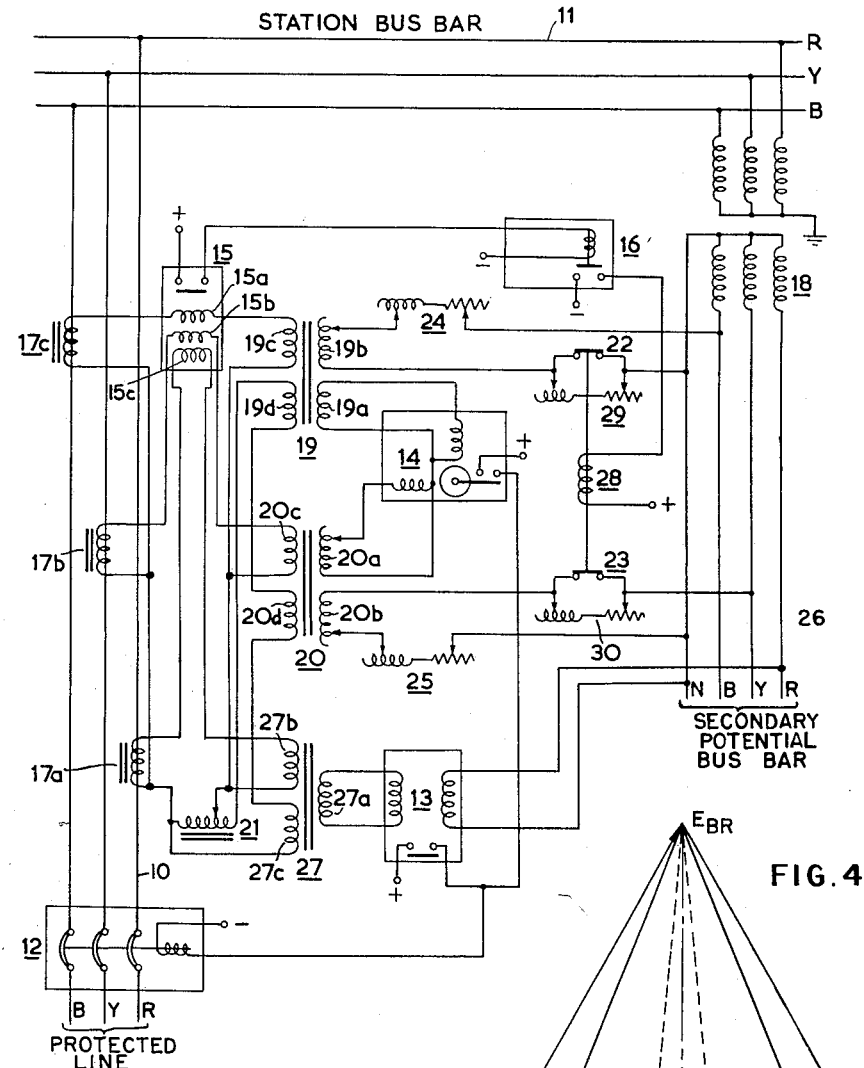
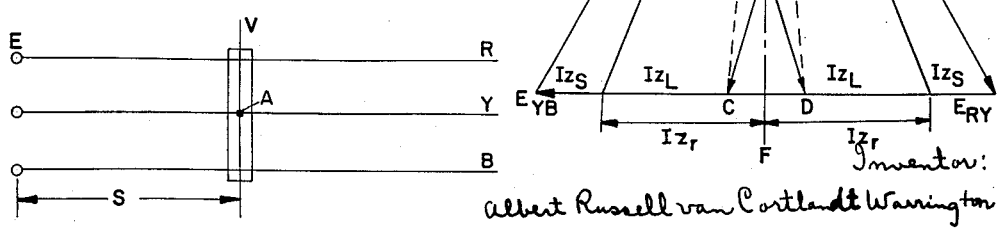
Inventor:
Albert Russell van Cortlandt Warrington
By: Stevens, Davis, Miller & Mosher
Attorneys

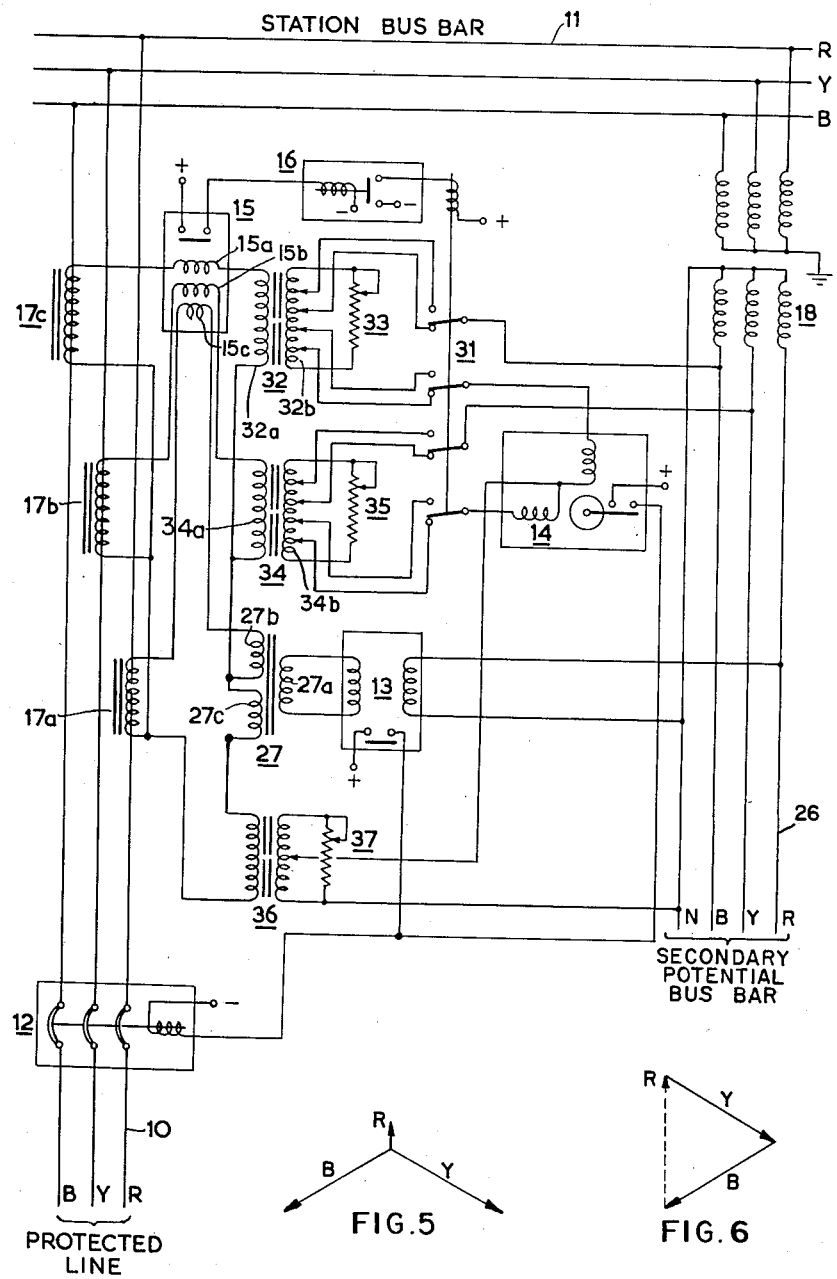

3,024,389
THREE-PHASE PROTECTIVE RELAY SYSTEMS

Albert Russell van Cortlandt Warrington, Stafford, England, assignor to The English Electric Company Limited, London, England, a British company
Filed May 29, 1958, Ser. No. 738,815
Claims priority, application Great Britain June 7, 1957
7 Claims. (Cl. 317—36)

This invention relates to three phase protective relay systems.

It is an object of the invention to provide a new and improved distance type three phase protective relay system which utilizes a simple operating principle and is economical in the use of circuit components.

According to the invention, a three-phase protective relay system includes, for each of at least two phases, first circuit means for producing signals proportional to the line current, second circuit means for producing signals proportional to the phase to neutral voltage, third circuit means including facsimile impedances representing the impedances of two of said phases over a protected section of the line, fourth circuit means for zero phase sequence component compensation, and an electro-responsive phase comparison device, said circuit means being connected to supply to said device, upon the occurrence of a fault on the line, two zero phase sequence compensated signals, each being the vector difference produced by said third circuit means between a first signal derived from said first circuit means and representing the impedance of the line between said circuit means and said fault and a second signal derived from said second and third circuit means and representing the impedance of the line between said circuit means and the end of said protected section of the line, said device being adapted to perform a relay function whose threshold of operation occurs when the sine product of said compensated signals is zero.

By the term "sine product" herein and in the appended claims is meant the product of the amplitudes of said compensated signals multiplied by the sine of the phase angle between them.

Other features of the invention will be apparent from the following description with reference to FIGS. 1 and 2 of the accompanying drawings, in which:

FIG. 1 shows a three phase protective relay system which uses a current compensation version of the principle of this invention;

FIG. 2 shows an alternative three phase protective relay system which utilizes voltage compensation as opposed to current compensation;

FIG. 3 is a schematic diagram of a protected section of the line; and

FIGS. 4, 5 and 6 are vector diagrams illustrating the principle of the system according to FIG. 2.

The system of FIG. 1 is preferred to that of FIG. 2 in view of the economy of circuit components.

In FIG. 1 a polyphase distance protective relay system incorporating the invention in one of its forms is shown schematically to comprise a three phase protected line 10 which is connected to a station busbar system 11 through a circuit breaker 12. The relay location is between the circuit breaker 12 and the station busbar system 11 and the relay responds to output signals supplied from current and voltage transformers connected to be energized by the current and voltage respectively of the protected line under conditions for which the circuit breaker 12 is closed.

Relay operation causes the circuit breaker 12 to trip and thereby disconnect the protected line 10 from the station busbar. Provision is shown in the circuit for circuit breaker tripping in response to the operation of two independent relay units. One of these units operates as a phase comparator and applies the broad principle of one aspect of this invention. The comparator may be of the electro-magnetic type exemplified by the induction cup unit or it may be of a static type such as a Hall effect crystal or a form of transistor comparator. It is essentially a device with a torque or output proportional to the sine product of the two currents flowing in its windings or the two voltages impressed upon these windings so that the threshold of operation is when the two currents or voltages are in phase or when one of them is zero.

In applying this principle, the relay is operative to guard against all faults with the exception of a symmetrical three phase fault. The other relay 13 is a simple single phase distance relay which is operative to trip the circuit breaker 12 in the event of a three phase to ground fault which does not permit the operation of the phase comparator unit and yet occurs within the protected section of the line.

Furthermore, under certain system conditions, the relay may seriously under-reach for a single phase to ground fault in the phase with which the relay is not associated and a single phase distance relay in that phase will also ensure reliable clearing of single phase to ground faults in that phase.

Although in the following description with reference to FIG. 1 there is provision for multi-zone operation of the comparator unit 14 to afford back-up protection for other relay systems which may be connected in neighbouring sections of the protected line, in a simple embodiment of the invention such multi-zone operation may not be required and, in this case, the fault detector unit 15 and the timer unit 16 need not be used.

The basic part of the circuit of FIG. 1 which includes the comparator unit 14 will operate in response to current signals derived from three current transformers 17a, 17b and 17c connected to be energized by the currents in the red, yellow and blue phases of the protected line respectively and also in response to only two of the phase to neutral voltage quantities of the three phases of the protected line. These two phases are in this case the yellow and blue phases. However, the phase to neutral potential of the third phase can be applied with advantage to operate the single phase distance relay unit 13 and thereby permit a more even loading of the current and voltage transformers 17 and 18 as well as ensuring the clearing of three phase faults and single phase to ground faults in the third phase. Red, yellow and blue phases are denoted by the symbols R, Y and B in the drawings; N denotes the neutral.

The comparator unit 14 is a current-operated phase angle comparator which operates according to the phase angle between two current signals supplied to its operating windings. These windings are energized from the secondary windings 19a and 20a of an auxiliary current transformer 19 and an auxiliary current transformer 20 respectively. Each of these transformers has three primary windings and constitutes circuit means for opposing signals supplied to two of these windings by a main signal supplied to the third winding. Thus, the transformer 19 has three primary windings 19b, 19c and 19d respectively. The winding 19b is energized by a current signal derived from the phase to neutral potential of the B phase output from the transformer 18. The winding 19c is connected in series with the secondary winding of the current transformer 17c and therefore carries a current which is directly proportional to the line current of the B phase. The winding 19d is connected to be energized through an autotransformer 21 which carries the residual current output from the three current transformers 17a, 17b and 17c. The arrangement of the windings on the transformer 19 is such that the two signals applied to windings 19c and 19d oppose the action of the winding 19b. Ttransformer 20 has primary windings 20b, 20c and 20d which are similarly connected to be energized by voltage and current signals applicable to the Y phase instead of to the B phase.

Insofar as the operation of the comparator unit 14 on a single zone basis is concerned, contact systems 22 and 23 connected in the supply circuit of windings 19b and 20b can be presumed to be closed as shown in the drawing. Under these conditions the circuits by which the windings 19b and 20b are energized in response to the line to neutral potentials of the B and Y phases of the secondary winding of transformer 18 merely include adjustable impedance elements 24 and 25 respectively. The impedances of these elements determine the length of a protected section of the line 10 extending from the relay location. The elements function to govern the magnitude of the current signals applied to the windings 19b and 20b respectively. In other words, they serve as circuit means by which current signals respectively proportional to the phase to neutral potentials of relevant phases of the protected line are produced.

The signals induced in the windings 19a and 20a are proportional to the current signals supplied to the windings 19b and 20b respectively as modified by the corresponding line current signal of the relevant phase and a signal proportional to the zero phase sequence current component of the protected line. The first of these signals in the windings 19a and 20a arises from the direct connection between transformer 17c and winding 19c and transformer 17b and winding 20c respectively, whereas the zero phase sequence signal component is derived via the transformer 21.

Because the relay torque or output is proportional to the sine product of the currents in its two windings the threshold of operation is when these two currents are in phase or when one of them is zero.

By reason of the replica impedances 24 and 25 representing the line impedances of the B and Y phase respectively between the relay location and the end of the protected section of the line, signals supplied to the two windings 19b and 20b respectively, represent the line currents of these phases for a short circuit at said end of the protected section of the line. By opposing each of these signals by a signal representing the vector sum of the actual line current and a current proportional to the zero phase sequence component of the three line currents, the output signal to the relay winding in the phase in which a single phase to ground fault occurs is substantially zero at a point along the line corresponding to the magnitude of the replica impedance, i.e., at said end of the protected section of the line. If the ground fault occurs in the third phase (to which the relay is not connected) the currents supplied to the relay windings are substantially in phase for a fault at a distance corresponding to the replica impedance. The relay therefore is at the threshold of operation at said point for a single phase to ground fault in any phase. In this way, owing to the phase reversal of the electrical signals so produced consequent upon their passing through zero amplitude, the phase sequence of the output signals supplied from the windings 19a and 20a provide an indication in the event that a line to ground fault occurs on one of the phases and within the protected section of the line. As is hereinafter explained, if the ground fault occurs on any phase the normal phase sequence R, Y, B on the relay windings becomes R, B, Y. The fault can therefore be detected by means of a comparator unit operative to measure phase sequence of the three signals. However, by utilizing the zero phase sequence compensation as in the circuit of FIG. 1, the detection of a fault condition can be achieved by a determination of the phase relationship between two signals derived respectively from two as opposed to three of the line phases. This results in a possible saving of relay components particularly where multi-zone operation is required. The single phase comparison operation of the comparator unit 14 can be understood by considering a variety of possible fault conditions on the protected section of the line 10. Thus, for example, consider the effect of a ground fault on the R phase of the protected section of the line. The result of this is a zero phase sequence current component which is approximately in phase with the phase to neutral voltage of the R phase. When a signal proportional to this zero phase sequence component is added to the line to neutral voltage signals of the Y and B phases of the line, these latter signals are phase shifted and, for a suitable setting of the system, a condition corresponding to a ground fault on the R phase of the line can be considered to correspond to a condition in which the B phase compensated signal lags behind the Y phase compensated signal by an angle in excess of say 180°. Such a condition is easy to detect by an induction type phase comparator unit. When a ground fault occurs on the Y phase of the protected section of line, the principal factor governing the phase change between the Y and B phase compensated signals is the compensating signal derived from the replica impedance unit 25. For a fault occurring on the protected section of line on the Y phase, the line current signal impressed on the winding 20c exceeds in strength the effect of the signal applied to winding 20b, these signals being the principal controlling quantities in this case determining the output signal from the winding 20a. On the other hand, if it so happens that the fault on the Y phase occurs outside the protected section of the line, the signal applied to the winding 20b will have the stronger effect and will be operative in determining the phase of the signal induced in winding 20a. In other words, the indication of a fault on the Y phase within the protected section arises from the reversal of the phase of the signal supplied by the winding 20a to the unit 14. Thus, whereas the Y phase of the compared signals normally leads the B phase by an angle of the order of 120°, the sudden reversal of the phase of the Y signals results in the B phase leading the Y phase which condition corresponds, in effect, to a lead of the Y phase over the B phase by an angle greater that 180°. In this way, if a fault on the Y phase has a similar effect to a fault on the B phase owing to the general symmetry of the system with regard to these two phases, it can be shown that a simple phase comparison between two signals applied to the unit 14 can yield an indication of a ground fault condition on any of the three phases of the protected section of the line.

The relay operates equally well for phase-to-phase faults. A fault between the phases associated with the relay causes the two currents supplied to the relay 14 from windings 19a and 20a to be in phase for faults separated from the relay location by a length of line corresponding to the facsimile impedance. Such a fault between either of the other two pairs of phases would cause the two currents supplied to the relay to be 180° out of phase. In either case the relay torque or output would be zero, i.e. it would be at the threshold of operation for a fault between any pair of phases at a distance from the relay corresponding to the impedance setting of the relay. It will be appreciated that, for a phase-to-phase fault, the windings 19d and 20d which, in the case of a ground fault supply the zero phase sequence current component correction, make no contribution to the operation of the relay.

The circuit operation just described fails when a symmetrical three phase to ground fault occurs on the line. This is so because on the occurrence of such a fault, the vectors of the currents supplied to the relay are merely shifted through 180°, the phase sequence remaining the same; hence, the relay 14 being sensitive to phase sequence reversal only, the relay will not operate. However, experience has shown that such fault conditions are extremely unlikely except in certain parts of the world and in the majority of applications of this invention this failing will be of little consequence. Nevertheless, the circuit of FIG. 1 includes provision for catering for the possibility of such a fault condition. Here, the unit 13, which is a single phase distance relay unit and which may have any of a variety of well known forms, is shown to be connected to respond to signals derived from the R phase. Thus, one operating winding of the unit 13 is shown to be energized directly in response to the phase to neutral potential of the R phase of the secondary potential busbar 26 and its other winding is energized according to the output from the secondary winding 27a of an auxiliary current transformer 27 having two primary windings 27b and 27c, one of which is energized directly in proportion to the line current of the R phase of the protected section of line 10 and the other of which carries the zero phase sequence current component signal supplied by the auto-transformer 21. The line current signal of the protected line is derived from the current transformer 17a.

In operation, a single phase distance relay will provide protection against a three phase to ground fault because such a fault condition must include the R phase.

The system shown in FIG. 1 is adapted for multi-zone working. For simplicity, the arrangement shown merely provides a two-zone operation but the principles embodied in the system can be extended quite simply to cover as many zones as is required. The length of the protected line is determined by the settings of the impedance units 24 and 25. To increase the range of protection, it is merely necessary to increase the impedances in the circuits of these units. To this end, the contact systems 22 and 23 form part of a zone switch which is operated in response to the energization of an operating winding 28. When this winding is de-energized the zone switch has the position shown. However, when the winding is energized contact systems 22 and 23 open simultaneously to introduce additional impedance units 29 and 30 in series with units 24 and 25 respectively. Zone switching is controlled by a fault detector unit indicated at 15. This unit may have a variety of forms evident to those skilled in the art. It is shown to be energized by currents of all three phases, windings 15a, 15b and 15c being shown to be connected respectively in series with the secondary windings of transformers 17a, 17b and 17c. The relay unit may, for example, respond to a rate of rise of the currents in these phases and serves to initiate the operation of a definite time relay 16. The function of this relay unit 16 is to delay the zone switching operation to give other relays operating on the principles of the unit 14 time in which to protect a relevant section of the line but, in the event that this other relay should fail to operate, the operation of relay unit 16 will by virtue of the zone switching extend the range of the relay unit 14 shown in the figure to provide the necessary back-up protection. Only two time-distance steps provided by the arrangements of FIGS. 1 and 2, but it is obvious that the more common arrangement of three time-distance steps or zones can be obtained by providing an extra contact on the timing unit 16 and duplicating the switching means 28 and 31.

The connection of the single phase distance relay unit 13 in the R phase of the secondary potential busbar 26 assists in balancing the load on the transformer 18. It may be desired in some applications to ensure that the relay imposes a symmetrical load on this transformer by connecting in circuit a dummy load which has an impedance corresponding to that of the circuit including units 24 and 29, or alternatively that of the circuit including the units 25 and 30. Such a unit would be connected in the R phase of the secondary potential busbar and in a multi-zone case provision for switching by the zone switch is necessary.

A variety of alternative applications of the principle of this invention are possible. Thus, whereas the windings 19d and 20d operate in conjunction with the autotransformer 21 to provide a zero phase sequence current component signal which governs the operation of the relay unit 14, a similar effect can be achieved by introducing in the voltage signal control a component representing the "neutral shift" voltage. The neutral shift voltage is three times the zero phase sequence voltage of the line. In such an embodiment an auxiliary voltage transformer may be used to supply a measure of the neutral shift voltage to operate as a substitute for the zero phase sequence signal components applied to the windings 19d and 20d.

Alternatively, the whole comparison function performed by the system can be a voltage comparison. A voltage comparison equivalent to the circuit shown in FIG. 1 is presented in FIG. 2. Corresponding reference numerals have been used for corresponding portions of the circuit. The operation of the relay unit 13 and the units 15 and 16 are identical to those of the operation of the corresponding units in FIG. 1. However, in this case the unit 14 operates in response to voltage signals supplied through the zone switch 31. The auxiliary current transformers 19 and 20 are replaced by three transactors. It is to be noted that a transactor is a transformer having an appreciable air gap in its magnetic core so that it produces secondary output voltage signals proportional to primary input current signals. In this case, in order that the zone switching should not interfere with the zero phase sequence component, the signal combining functions performed by the use of the multi windings such as 19c and 19d in FIG. 1 are achieved by a direct signal combination at the input to the comparator unit 14. Thus, in FIG. 2 a transactor 32 has its primary winding 32a energized directly by the current supplied from the secondary winding of transformer 17c and has a secondary winding 32b which feeds a variable resistor 33, which causes a small leading phase shift in the secondary voltage of the transactor 32 so that its impedance (secondary voltage/primary current) is caused to have the same phase angle as the impedance of the protected section of the line: signals derived from the winding 32b are opposed by a phase to neutral voltage supplied from the B phase of the transformer 18. According to the position of the switch 31 either of two output signals from winding 32b is opposed in this way. Each circuit through the switch 31 includes two tappings on the secondary winding 32b and an adjustment of these tappings can afford an adjustment of the impedance without changing the phase angle, so that the voltage signals supplied by winding 32b represent the potential drop attributable to the phase current of the B phase in passing through an impedance which is regarded as a replica of the impedance of the protected section of the line 10. A similar circuit comprising a transactor 34 having a phase shifting resistor 35 is connected in the Y phase of the system. The two signals so produced are combined with a voltage signal proportional to the zero phase sequence current component of the line 10. This is derived from the transactor 36 which is energized by the sum total of the current outputs of all the current transformers 17a, 17b and 17c and has the phase shifting resistor 37 connected across its secondary winding. By manipulating tappings on the secondary winding of the transactor 36 a voltage output signal is obtained which is a measure of the potential drop arising from the passage of the zero phase sequence current component of the line through an adjustable impedance. The system is set by suitably adjusting the relevant tappings on the transactor output circuits so that signals are produced which are equivalent to the potential drops in the line ground loop circuit of the Y and B phases. By virtue of the connections shown in the drawings, these signals are opposed by the phase to neutral voltage signals of the relevant phases and applied to the phase angle comparison relay unit 14 which operates to perform a relay function by energizing the trip coil of the circuit breaker 12 and thereby tripping the circuit breaker according to the phase angle between the signals applied to the windings of the unit 14.

The principle of operation of the circuit shown in FIG. 2 is analogous to that of the circuit shown in FIG. 1, the relevant voltage signal components having a magnitude and phase significance equivalent to the current components of the circuit of FIG. 1.

In order to assist in the understanding of the operation of the phase comparator unit 14 and the function of the signals supplied thereto, the underlying theory will now be explained in greater detail with reference to FIGS. 1 to 6.

In FIG. 3 a protective relay A is shown to be located at a distance $s$ from a three-phase source of electric power having a generated E.M.F. (line to line) E, the line impedance between this source and the relay location being $z_s$, so that, for a phase to phase fault, the line voltage at the relay $V = E - 2Iz_s$, where I is the line current. The relay is intended to function as a distance relay having a reach corresponding to a line impedance $z_r$.

For convenience, the explanation will firstly be given in relation to current comparison, i.e., for a system according to FIG. 1.

If a short-circuit between two phases, say the Y and the B phase, occurs at a distance from the relay corresponding to a line impedance $z_L$, then the line current is given by the equation $$I = V/2z_L$$

Since the fault under consideration is a phase-to-phase fault, the zero phase sequence components supplied by windings 19d and 20d can be ignored and only the signals supplied to the phase comparator 14 by output windings 19a and 20a as a result of the vector subtraction of the signals supplied by windings 19b and 19c on the one hand, and 20b and 20c on the other need be considered. Since windings 19b and 20b, by reason of the replica impedances 24 and 25, which are each equal to $z_r$, provide current signals corresponding to $V/z_r$ (i.e., the line current corresponding to a phase-to-phase short-circuit at the end of the protected section of line) and windings 19c and 20c provide current signals corresponding to $V/z_L$ (i.e., the line current corresponding to the actual fault location) in opposition to the first-mentioned signals, it follows that the current signals supplied to the windings of the phase comparator 14 via the output windings 19a and 20a represent the vector difference between $V/z_L$ and $V/z_r$.

Therefore, if $V/z_L$ is greater than $V/z_r$ (i.e., if the fault is inside the protected section of line) the current vector representing the vector difference between these two current signals will have one particular direction whilst, if $V/z_L$ is less than $V/z_r$ the said vector representing the resulting current will be in the opposite direction and hence phase reversal will occur, which is detected by the phase comparator 14. It will also be appreciated that the threshold of phase reversal occurs where $V/z_L = V/z_r$; this condition represents a fault at the end of the protected section of line and constitutes the threshold of operation of the relay.

Referring now to the voltage comparison system of FIG. 2 (again in relation to a phase-to-phase fault in which, as previously mentioned, no zero phase sequence components are present) FIG. 4 is a vector diagram showing the various voltage vectors involved. Since the windings 32a and 34a provide signals corresponding to $Iz_L$ (i.e., the line drop between the relay location and the actual fault location) and the line voltages supplied to the secondaries of the transactors 32 and 34 from the transformer 18 provide signals corresponding to $Iz_r$ (i.e., the line drop between the relay location and the end of the protected section of line) by reason of these transactors in combination with their respective phase shifting resistances 33 and 35 having impedances with the same phase angles as $z_r$, and since these $Iz_r$ signals are applied in such a manner as to oppose the $Iz_L$ signals, it follows that the signals supplied to the windings of the phase comparator 14 via the output windings 32b and 34b represent the vector difference between $Iz_L$ and $Iz_r$.

Therefore, as will be apparent from FIG. 4 in which the currents in the relay windings are represented by vectors HC and HD respectively, if $Iz_L$ is less than $Iz_r$ (i.e., if the fault is inside the protected section of line) conditions will be as shown in this figure, whilst, if $Iz_L$ is greater than $Iz_r$, points C and D in FIGURE 4 will cross the center line F and hence phase sequence reversal will occur, which is detected by the phase comparator 14. It will also be seen from FIG. 4 that the threshold of phase reversal occurs where $Iz_L = Iz_r$; this represents a fault at the end of the protected section of line and constitutes the threshold of operation of the relay.

The explanation given so far applies as long as the three line voltages form a closed triangle, as is always the case with faults between phases. However, this does not apply for faults between one phase and ground. FIGURE 5 is a vector diagram showing the phase voltages in a three phase system having a ground fault on the R phase, resulting in a zero phase sequence component represented by one-third of the interrupted line in FIG. 6, which shows the line voltages corresponding to this ground fault.

This zero phase sequence component must, for correct relay operation under the aforesaid unbalance ground fault conditions, be subtracted and this is achieved, in the circuit of FIG. 1 by means of the auto-transformer 21 and the windings 19d and 20d. In the arrangement shown in FIG. 2, this correction is achieved by means of the transactor 36 and the resistor 37.

What I claim as my invention and desire to secure by Letters Patent is:

1. A three phase protective relay system including, for each of at least two phases, first circuit means for producing signals proportional to the line current, second circuit means for producing signals proportional to the phase to neutral voltage, third circuit means including facsimile impedances representing the impedances of two of said phases over a protected section of the line, fourth circuit means for zero phase sequence component compensation, and an electro-responsive phase comparison device, said circuit means being connected to supply to said device, upon the occurrence of a fault on the line, two zero phase sequence compensated signals, each being the vector difference produced by said third circuit means between a first signal derived from said first circuit means and representing the impedance of the line between said circuit means and said fault and a second signal derived from said second and third circuit means and representing the impedance of the line between said circuit means and the end of said protected section of the line, said device being adapted to perform a relay function whose threshold of operation occurs when the sine product of said compensated signals is zero.

2. A three phase protective relay system including a protected three phase line, current transformer means connected to be energized by the current in said line to produce first current signals representing the line current of each phase of the line, transformer means connected to be energized by the current in said line to produce second current signals representing the zero phase sequence current component of the line currents, voltage transformer means connected to be energized by the voltage of said line to produce voltage signals representing the line to neutral voltages of two phases of the line, circuit means, including facsimile impedances of two phases of the protected section of line, said circuit means being connected to have the voltage signals supplied by said transformer means impressed on said facsimile impedances, thereby to produce third current signals representing the phase current for a short circuit at the end of a protected section of the line, further circuit means connected to each of two phases of the line for vectorially summating said first and second current signals and vectorially subtracting said third current signal from the sum of said first and second current signals, thereby to produce a fourth current signal for each of said two phases, and an electro-responsive phase comparison device, connected to respond to said fourth current signals and adapted to perform a relay function whose threshold of operation occurs when the sine product of said fourth signals is zero.

3. A three phase protective relay system including a protected three phase line, current transformer means connected to be energized by the current in said line to produce first current signals representing the line current of each phase of the line, voltage transformer means connected to be energized by the voltage of said line to produce voltage signals representing the line to neutral voltages of two phases of the line, circuit means connected to provide said voltage signals with a neutral shift voltage equivalent to the zero phase sequence component of the line to neutral voltage of the line thereby to produce compensated voltage signals, second circuit means including facsimile impedances of two phases of the protected section of line, said second circuit means being connected to have said compensated voltage signals impressed on said facsimile impedances, thereby to produce second current signals representing the phase current for a short circuit at the end of a protected section of the line, third circuit means connected to each of two phases of the line for providing the vector difference between said first and second current signals, thereby to produce a third current signal for each of said two phases, and an electroresponsive phase comparison device connected to respond to said third current signals and adapted to perform a relay function whose threshold of operation occurs when the sine product of said third signals is zero.

4. A three phase protective relay system comprising a protected three phase line, current transformer means connected to be energized by the current in said line to produce current signals representing the line current of each phase of the line, voltage transformer means connected to be energized by the voltage of said line to produce first voltage signals representing the line to neutral voltages of two phases of the line, first circuit means including facsimile impedances of two phases of the protected section of line, said first circuit means being connected for providing, for each of said two phases, a fourth voltage signal representing the vector difference between a second voltage represented by the product of said current signal and the impedance of the line and a third voltage represented by the product of a current representing said first voltage signal and said facsimile impedance, second circuit means connected to provide a zero phase sequence component of the voltage of said line, and an electro-responsive phase comparison device connected to receive said fourth voltage signals of each of said two phases and said zero phase sequence components of voltage and adapted to compensate said fourth voltage signals by said zero phase sequence components, to respond to the so-compensated voltage signals and to perform a relay function whose threshold of operation occurs when the sine product of said compensated signals is zero.

5. A three phase protective relay system including a protected three phase line, current transformer means connected to be energized by the current in said line to produce first current signals representing the line current of each phase of the line, transformer means connected to be energized by the current in said line to produce second current signals representing the zero phase sequence current component of the line currents, voltage transformer means connected to be energized by the voltage of said line to produce voltage signals representing the line to neutral voltages of two phases of the line, circuit means, including facsimile impedances of two phases of the protected section of line, said circuit means being connected to have the voltage signals supplied by said transformer means impressed on said facsimile impedances, thereby to produce third current signals representing the phase current for a short circuit at the end of a protected section of the line, further circuit means connected to each of two phases of the line for vectorially summating said first and second current signals and vectorially subtracting said third current signal from the sum of said first and second current signals, thereby to produce a fourth current signal for each of said two phases, a first electro-responsive device connected to respond to said fourth current signals and adapted to perform a relay function whose threshold of operation occurs when the sine product of said fourth signals is zero, a second electro-responsive device comprising a single-phase distance relay connected to be energized by signals derived from the line energized current transformer and voltage transformer in the phase with which said first electro-responsive device is not associated, a circuit interrupter connected in said protected line, and trip means for promoting the tripping operation of said circuit interrupter in response to the operation of either of said electro-responsive devices.

6. A three phase protective relay system including a protected three phase line, current transformer means connected to be energized by the current in said line to produce first current signals representing the line current of each phase of the line, voltage transformer means connected to be energized by the voltage of said line to produce voltage signals representing the line to neutral voltages of two phases of the line, circuit means connected to provide said voltage signals with a neutral shift voltage equivalent to the zero phase sequence component of the line to neutral voltage of the line thereby to produce compensated voltage signals, second circuit means including facsimile impedances of two phases of the protected section of line, said second circuit means being connected to have said compensated voltage signals impressed on said facsimile impedances, thereby to produce second current signals representing the phase current for a short circuit at the end of a protected section of the line, third circuit means connected to each of two phases of the line for providing the vector difference between said first and second current signals, thereby to produce a third current signal for each of said two phases, a first electro-responsive device connected to respond to said third current signals and adapted to perform a relay function whose threshold of operation occurs when the sine product of said third signals is zero, a second electro-responsive device comprising a single-phase distance relay connected to be energized by signals derived from the line energized current transformer and voltage transformer in the phase with which said first electro-responsive device is not associated, a circuit interrupter connected in said protected line, and trip means for promoting the tripping operation of the circuit interrupter in response to the operation of either of said electro-responsive devices.

7. A three phase protective relay system comprising a protected three phase line, current transformer means connected to be energized by the current in said line to produce current signals representing the line current of each phase of the line, voltage transformer means connected to be energized by the voltage of said line to produce first voltage signals representing the line to neutral voltages of two phases of the line, first circuit means including facsimile impedances of two phases of the protected section of line, said first circuit means being connected for providing, for each of said two phases, a fourth voltage signal representing the vector difference between a second voltage represented by the product of said current signal and the impedance of the line and a third voltage represented by the product of a current representing said first voltage signal and said facsimile impedance, second circuit means connected to provide a zero phase sequence component of the voltage of said line, a first electro-responsive device connected to receive said fourth voltage signals of each of said two phases and said zero phase sequence components of voltage and adapted to compensate said fourth voltage signals by said zero phase sequence components, to respond to the so-compensated voltage signals and to perform a relay function whose threshold of operation occurs when the sine product of said compensated signals is zero, a second electro-responsive device comprising a single-phase distance relay connected to be energized by signals derived from the line energized current transformer and voltage transformer in the phase with which said first electro-responsive device is not associated, a circuit interrupter connected in said protected line, and trip means for promoting the tripping operation of said circuit interrupter in response to the operation of either of said electro-responsive devices.

References Cited in the file of this patent

UNITED STATES PATENTS

| | | |
|---|---|---|
| 2,406,411 | Sonnemann | Aug. 27, 1946 |
| 2,545,987 | Blockburn | Mar. 20, 1951 |
| 2,561,998 | Sonnemann | July 24, 1951 |
| 2,743,396 | Goldsborough | Apr. 24, 1956 |

OTHER REFERENCES

AIEE "Transactions," vol. 77, pt. 111, June 1958, pp. 383–402.